United States Patent Office 3,011,756
Patented Dec. 5, 1961

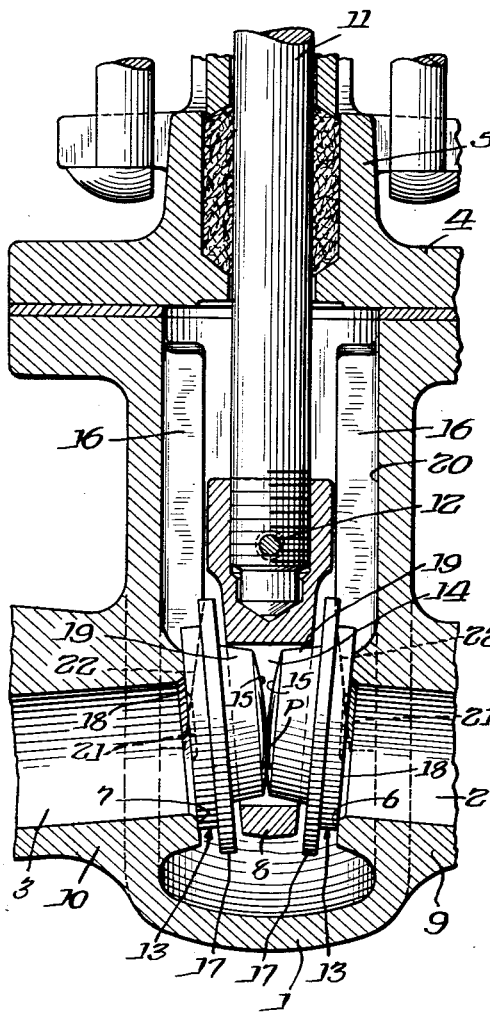
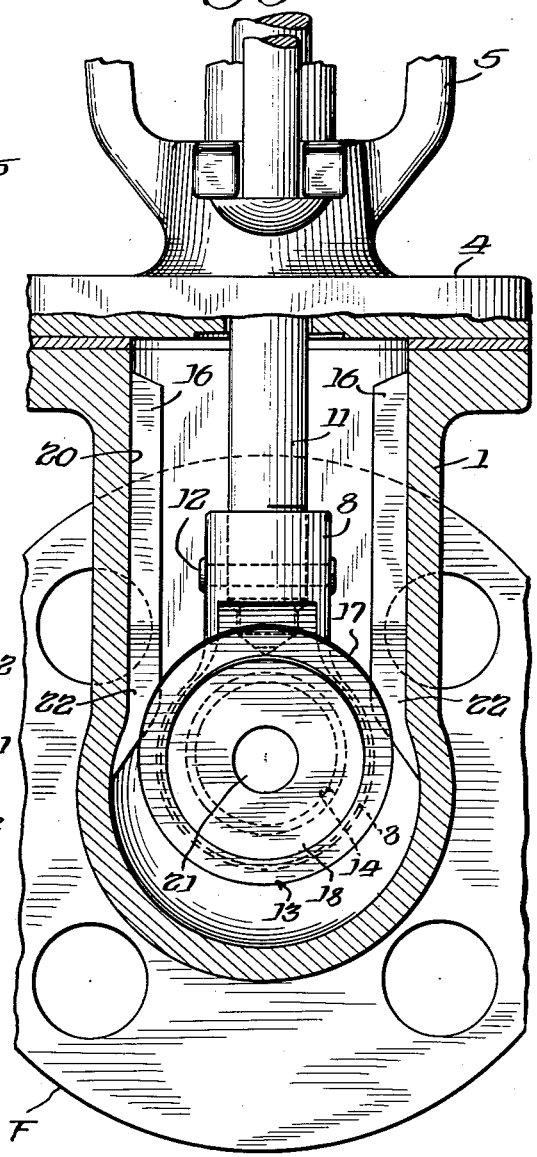

3,011,756
FLEXIBLE DOUBLE DISC GATE VALVE
Carl A. Dopp, Park Ridge, Ill., assignor to Crane Co., Chicago, Ill., a corporation of Illinois
Filed Apr. 29, 1953, Ser. No. 351,857
1 Claim. (Cl. 251—167)

This invention relates to gate valves, and more particularly it pertains to the type of valve known to those skilled in the art as double disc wedge gate valves.

In order to better appreciate the need and background of this contribution to the art, it should be noted that in gate valve manufacture there has been steady demand for a simplified method of effecting a fluid-sealing closure by means of independently adjusting discs. It is an object of this invention to satisfy the above need by providing a valve employing discs which are independently adjustable in conformance to their respective body seats, thus effecting a more efficient closure.

Heretofore many complex and consequently expensive parts were employed in valves of this type; the components of the presently described invention are few in number, simple in design, economical to manufacture and easy to replace if necessary.

It is a further object of this invention to provide a guide means which not only performs the usual guiding function, but does so in such a manner whereby the seating faces are preserved from contact with any surface save in the seated position, thus adding to the useful life of the discs.

It is a still further object of this invention to devise a simple torque transmission means whereby the applied seating load is radiated in an even manner to the seat peripheries by the simple coaction of the valve discs as will hereinafter be described.

Other objects and advantages will become more readily apparent upon proceeding with the following detailed description in connection with the accompanying drawing, in which:

FIG. 1 is a fragmentary vertical sectional assembly view of a valve embodying my invention.

FIG. 2 is a fragmentary vertical sectional assembly view of such a valve taken at right angles to the view described in FIG. 1.

Referring to FIG. 1, the illustrative embodiment of my invention is a gate valve, the valve comprising the usual body or casing 1 having an inlet 2 and outlet 3, a bonnet 4, a yoke member 5 (the latter member being fragmentarily shown), body seats 6 and 7 which may be integral with the body as shown or removable rings and body shank portions 9 and 10. It will be noted that a guided disc carrier 8 is provided, having positioned therewithin the discs 13. A stem 11 is connected at its lower end by a pin 12 or other suitable locking means to the carrier 8, and at its upper end to a suitable actuating means (not shown). The ends (not shown) of the inlet 2 and the outlet 3 are suitably formed for attachment to a pipeline. While bolted flanged means F are shown in the latter connection in FIG. 2, any suitable attaching means may be utilized as for instance pipe threads, weld ends and the like. For descriptive purposes, I have specified the flow as moving from 2 to 3, however, the flow may optionally be reversed, and in the event of such an alternative the valve will operate in the same advantageous manner.

The disc carrier 8 is of general wedge shape or configuration and may be of one-piece construction as shown. The twin discs 13 are inserted in a back-to-back relation in the carrier aperture 14. The diameter of the carrier aperture 14 is of such magnitude that the projecting portions 19 of the discs 13 may freely rotate therewithin in the course of any axial movement by said closure member. The end limits 15 of the projecting disc portions 19 are preferably of spherical configuration, this latter configuration allowing a mere point contact P when the discs are in the seated position as shown in FIG. 1. It will be understood that the point P is the transmissional means whereby the torque or seating load applied axially through the stem 11 is radiated about the peripheries of the body seats 6 and 7 in an even manner effecting an efficient fluid-sealing closure.

The guiding means employed in my invention comprises ribs 16 positioned substantially vertical in the casing 1 and chamfered in their lower extremities 22 which terminate in the proximity of the inlet seat 6 and the outlet seat 7. Upon the occurrence of upward movement of the disc carrier 8, the annular shoulders 17 of the discs 13 slidably cooperate with guide ribs 16 effecting withdrawal of the disc seating faces 18 from their respective casing seats 6 and 7. As may be seen from FIG. 1, the guide ribs 16 project from the casing wall 20 sufficiently to prevent the seating faces 18 and recessed central portions 21 from contacting any valve member save in the seated position.

Conversely, upon the occurrence of downward movement of the disc carrier 8, the discs 13, free to rotate within the aperture 14 and to slidably cooperate by means of their annular shoulders 17 with guide ribs 16, are guided onto body seats 6 and 7 whereupon a fluid-sealing closure is effected with a force radiating from point P. It will be noted that it is the simple coaction of the valve discs at their end limits 15 which enables the disc seating faces 18 to independently adjust to the configuration of their respective casing seats. It will also be noted that the seating force radiating from point P is evenly distributed effecting a fluid-sealing function with a bare minimum of the force being dissipated as frictional components in the valve closure member. It has been discovered that the efficiency of the point disc contact enables a lesser seating load to effect a satisfactory fluid sealing closure than has heretofore been possible with the conventional valve closure members.

Whereas protruding ribs have been depicted as the disc guiding means in the pictorial representation of my invention, it is of course understood that other similar means as for example recesses, grooves or the like fall within its scope.

Thus, it will be apparent that I have devised in a relatively simple valve construction a double disc gate valve employing independently adjustable discs which cooperate to efficiently transmit the applied seating load to the seating surfaces with a bare minimum of frictional loss. In addition, I have devised a guiding means for a double disc wedge gate valve which preserves the disc seating faces from wear in all save the seated position.

With the foregoing in mind, it should be readily apparent that the invention lies in the novel arrangement and combination of parts and in details of construction now to be claimed. Therefore, be it understood that changes in the construction and in the arrangement of the various parts may be made without departing from the spirit or scope of the invention as determined by the appended claim.

I claim:

In a gate valve, the combination comprising a casing having a fluid passageway therethrough, tapered inlet and outlet seats for the casing, a closure member reciprocally movable within the casing and tapered so as to co-act with said seats, the said closure member comprising an apertured carrier, a pair of opposed discs with annular shoulders, said discs also having oppositely disposed inwardly projecting annularly tapered portions with spheroidal end surfaces in normally abutting relation loosely receivable within said carrier aperture, the said discs being freely rotatable and reciprocally movable by said carrier, guiding means within said casing comprising a pair of oppositely disposed spaced-apart ribs on each side of the said seats having lower limits defined by chamfered surfaces which cooperate in the initial valve opening movement with undersurfaces of the said annular disc shoulders whereby the transverse movement of the said discs outwardly relative to said carrier in the valve open position is determined by the space between the said ribs, the latter space being less than the space between said inlet and outlet seats.

References Cited in the file of this patent

UNITED STATES PATENTS

| | | |
|---|---|---|
| 164,538 | Frisbie | June 15, 1875 |
| 284,122 | Dover | Aug. 28, 1883 |
| 533,991 | Layman | Feb. 12, 1895 |
| 1,498,018 | Cronkhite | June 17, 1924 |
| 2,075,123 | Lunken | Mar. 30, 1937 |

FOREIGN PATENTS

| | | |
|---|---|---|
| 866,285 | Germany | July 8, 1949 |
| 1,005,603 | France | Apr. 15, 1952 |